United States Patent
Yen et al.

(10) Patent No.: US 12,361,705 B2
(45) Date of Patent: Jul. 15, 2025

(54) SYSTEM AND METHOD FOR REDUCING SURVEILLANCE DETECTION ERRORS

(71) Applicant: Deep Sentinel Corp., Pleasanton, CA (US)

(72) Inventors: Chao-Ming Yen, Pleasanton, CA (US);
David Selinger, Pleasanton, CA (US);
Stephen Withers, Pleasanton, CA (US);
Praveen Nataraj, Pleasanton, CA (US);
Patrick Darrow, Pleasanton, CA (US);
Travis Richardson, Pleasanton, CA (US);
Yu-Chung Cheng, Pleasanton, CA (US);
Jui-Chi Tang, Pleasanton, CA (US)

(73) Assignee: Deep Sentinel Corp., Pleasanton, CA (US)

( * ) Notice: Subject to any disclaimer, the term of this patent is extended or adjusted under 35 U.S.C. 154(b) by 856 days.

(21) Appl. No.: 17/484,814

(22) Filed: Sep. 24, 2021

(65) Prior Publication Data
US 2023/0095027 A1  Mar. 30, 2023

(51) Int. Cl.
*G06V 10/98* (2022.01)
*G06N 3/02* (2006.01)
*G06N 20/00* (2019.01)
*G06V 10/82* (2022.01)
*G06V 20/52* (2022.01)
*G06V 20/64* (2022.01)

(52) U.S. Cl.
CPC ............. *G06V 10/987* (2022.01); *G06N 3/02* (2013.01); *G06N 20/00* (2019.01); *G06V 10/82* (2022.01); *G06V 20/52* (2022.01); *G06V 20/64* (2022.01)

(58) Field of Classification Search
CPC ...... G06V 10/987; G06V 20/52; G06V 20/64; G06V 10/82; G06N 20/00; G06N 3/02; G06N 3/08; G06N 3/045; G06T 7/70; G06T 7/246; G06T 7/20; G06F 21/32; G06K 9/00771; H04N 7/18
See application file for complete search history.

(56) References Cited

U.S. PATENT DOCUMENTS 11,200,454 B1 *  12/2021  Qian ..................... G06V 10/776
12,136,294 B1 *  11/2024  Thayer ................. G06V 40/166
(Continued)

FOREIGN PATENT DOCUMENTS

CN   111372042 A *  7/2020 ............... G06K 9/32
WO   2019126723       6/2019

*Primary Examiner* — Aaron W Carter
(74) *Attorney, Agent, or Firm* — McCarter & English, LLP; Michael A. Sartori

(57) ABSTRACT

A method is disclosed. The method includes providing an imaging apparatus, recording image data of an imaging location using the imaging apparatus, displaying the image data to a user via a user device, selecting an image object from the image data based on a selection criteria, and determining whether or not a selection criteria error of the image object is to be checked. The method also includes displaying a bounding shape, which bounds the image object, to the user via the user device when the selection criteria error is to be checked, prompting the user to enter user input indicating whether or not the selection criteria error is present, and storing data of the image object in a cache when the user input indicates that the selection criteria error is present.

19 Claims, 5 Drawing Sheets

(56) References Cited

U.S. PATENT DOCUMENTS

| | | | |
|---|---|---|---|
| 2009/0154795 A1* | 6/2009 | Tan | G06F 16/583 |
| | | | 382/155 |
| 2011/0301980 A1 | 12/2011 | Martucci et al. | |
| 2013/0009950 A1 | 1/2013 | Ben-David et al. | |
| 2013/0155229 A1* | 6/2013 | Thornton | H04N 7/18 |
| | | | 348/143 |
| 2015/0302642 A1 | 10/2015 | Miller | |
| 2017/0124385 A1* | 5/2017 | Ganong | G06K 9/00 |
| 2018/0165550 A1* | 6/2018 | Aas | G06K 9/62 |
| 2019/0051050 A1 | 2/2019 | Bell et al. | |
| 2019/0205659 A1* | 7/2019 | Cuban | G06V 20/41 |
| 2019/0311201 A1 | 10/2019 | Selinger | |
| 2019/0313024 A1 | 10/2019 | Selinger | |
| 2020/0159937 A1* | 5/2020 | Schondorf | G06F 21/60 |
| 2020/0168076 A1* | 5/2020 | Okamoto | G08B 29/18 |
| 2020/0265259 A1* | 8/2020 | Paul | G06K 9/32 |
| 2020/0334448 A1* | 10/2020 | Ghazaryan | G06V 10/82 |
| 2021/0117724 A1* | 4/2021 | Taheri | G06V 30/274 |
| 2021/0365739 A1* | 11/2021 | Carmena | G06V 10/764 |
| 2023/0078218 A1* | 3/2023 | Wang | G06N 3/098 |
| | | | 706/12 |
| 2023/0095027 A1* | 3/2023 | Yen | G06N 7/01 |
| | | | 382/311 |
| 2023/0139682 A1* | 5/2023 | Kale | G06N 3/08 |
| | | | 382/159 |
| 2023/0386185 A1* | 11/2023 | Park | G06V 10/761 |
| 2024/0233342 A1* | 7/2024 | Cheng | G06V 20/44 |
| 2024/0233445 A1* | 7/2024 | Yau | G06F 21/6245 |
| 2025/0061721 A1* | 2/2025 | Betigeri | G06V 40/172 |

* cited by examiner

SYSTEM AND METHOD FOR REDUCING SURVEILLANCE DETECTION ERRORS

TECHNICAL FIELD

The present disclosure generally relates to a system and method for reducing detection errors, and more particularly to a system and method for reducing surveillance detection errors.

BACKGROUND

Most state-of-the-art AI-powered surveillance camera systems utilize deep learning algorithms for detecting security-related objects. Specifically, object detection using a deep neural network (DNN) and more specifically Convolutional Neural Network (CNN) is a popular technique for detection tasks.

Though using CNN has an advantage of quickly learning patterns from unstructured data, CNN may sometimes make false positive errors. When applying a CNN model on a camera, such false positive errors contribute to consistent false alarms.

To reduce object detection errors from CNN on a still video stream, a number of pre-existing approaches exist. Some of these conventional approaches are described below.

One conventional approach is to track a detected object across multiple frames. For example, a trajectory of the inanimate detection errors should show that the object mostly stays at the same location. One may use this pattern to filter inanimate detection noise. However, a disadvantage with this approach is that it may be difficult to differentiate a true positive case when an object of interest is not moving or when it is slightly loitering or remaining in a location. For example, a person who stands still in a location may be considered to be an inanimate detection error and may be filtered by this approach. Further, a system will likely have a high risk of false negatives if the system primarily uses this approach to deal with detection errors.

Another conventional approach is to combine object detection with background subtraction to detect moving objects. Theoretically, this approach should filter a large portion of inanimate detection errors. However, in real-world applications, many detection errors are accompanied by moving shadows or light reflections, which are considered as valid motion by most background subtraction models. Further, waving flags and trees often consistently create random motion. This approach is unable to filter these "noisy" objects efficiently.

A further conventional approach is to create a zone to mask out a hotspot area of a scene or field of view that frequently experiences positive detected results. The disadvantage of this approach is that detection in that area is completely negated. For example, if an object of interest passes by a hotspot area, the object will be filtered. Therefore, a system primarily using this conventional approach will typically experience a high risk of false negatives in dealing with detection errors.

An additional conventional approach is to temporarily disable video stream from a camera for a short time when human users sense that the camera is consistently generating false alarms. The disadvantage of this approach is that during the downtime nothing can be detected, including valid objects of interest. Accordingly, a system will experience a high risk of false negatives when primarily utilizing this approach to deal with detection errors.

Another conventional approach is to keep collecting data and also retrain the CNN model, and then re-deploy the model to reduce the detection noise. The disadvantage of this approach is that it relies heavily on data collection and also a burdensome amount of human labor to perform associated labeling. In addition, the entire iteration cycle typically takes a relatively long time to be completed before a new model can be shipped to a production environment. While this may be a canonical technique for applying deep learning models in real production, the result is typically directed toward more of a general model improvement and is less focused on reducing repeating inanimate detection errors. Ultimately this means that this approach is unlikely to solve the problem.

The exemplary disclosed system and method are directed to overcoming one or more of the shortcomings set forth above and/or other deficiencies in existing technology.

SUMMARY OF THE DISCLOSURE

In one exemplary aspect, the present disclosure is directed to a method. The method includes providing an imaging apparatus, recording image data of an imaging location using the imaging apparatus, displaying the image data to a user via a user device, selecting an image object from the image data based on a selection criteria, and determining whether or not a selection criteria error of the image object is to be checked. The method also includes displaying a bounding shape, which bounds the image object, to the user via the user device when the selection criteria error is to be checked, prompting the user to enter user input indicating whether or not the selection criteria error is present, and storing data of the image object in a cache when the user input indicates that the selection criteria error is present.

In another aspect, the present disclosure is directed to a surveillance detection error reduction system. The system includes an imaging apparatus, a user device, a surveillance detection error reduction module, comprising computer-executable code stored in non-volatile memory, and a processor. The imaging apparatus, the user device, the surveillance detection error reduction module, and the processor are configured to record image data of an imaging location using the imaging apparatus, display the image data to a user via the user device, select a first image object from the image data based on a selection criteria, and determine whether or not a selection criteria error of the first image object is to be checked. The imaging apparatus, the user device, the surveillance detection error reduction module, and the processor are also configured to display a bounding shape, which bounds the first image object, to the user via the user device when the selection criteria error is to be checked, prompt the user to enter user input indicating whether or not the selection criteria error is present, store data of the first image object in a cache when the user input indicates that the selection criteria error is present, and select a second image object from the image data based on the selection criteria and then subsequently deselect the second image object based on comparing the second image object to the data of the first image object stored in the cache.

BRIEF DESCRIPTION OF THE DRAWINGS

Accompanying this written specification is a collection of drawings of exemplary embodiments of the present disclosure. One of ordinary skill in the art would appreciate that these are merely exemplary embodiments, and additional and alternative embodiments may exist and still be within the spirit of the disclosure as described herein.

DETAILED DESCRIPTION AND INDUSTRIAL APPLICABILITY

The exemplary disclosed system and method may include a system utilizing object detection. For example in at least some exemplary embodiments, the exemplary disclosed system and method may include a surveillance system such as, for example, a video surveillance system. The exemplary disclosed system and method may include an AI-powered system such as an AI-powered surveillance system.

Figure 1:
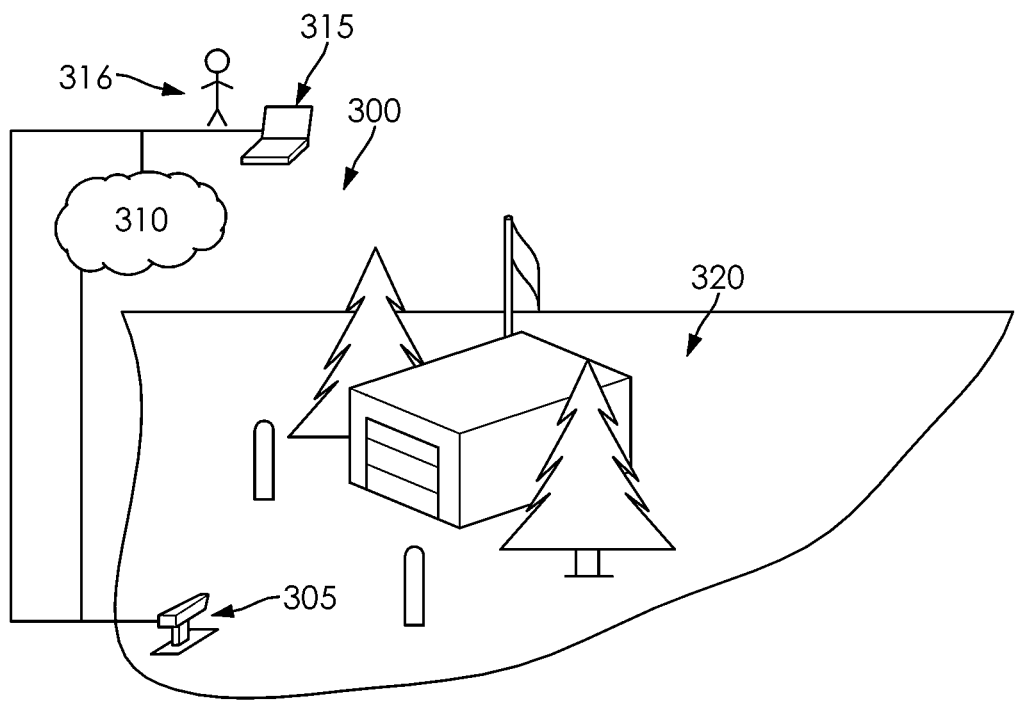
FIG. 1 illustrates a schematic view of at least some exemplary embodiments of the present disclosure.
Figure 2:
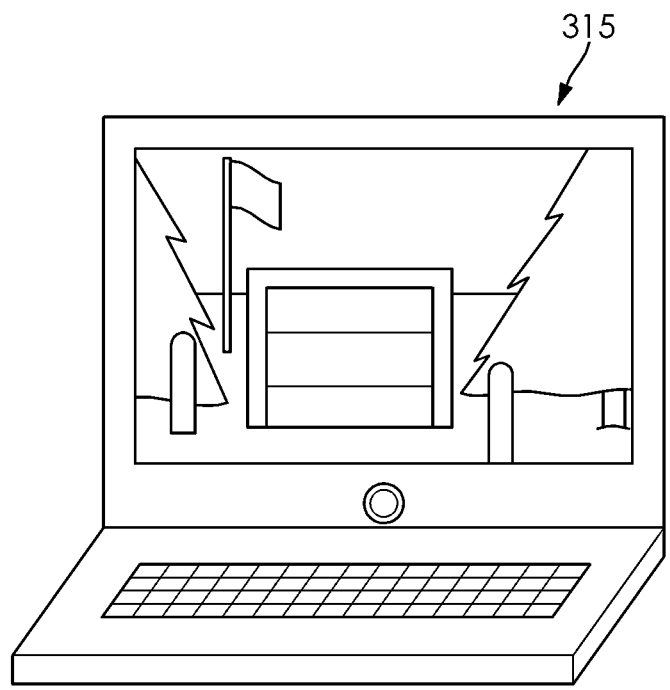
FIG. 2 illustrates a perspective view of at least some exemplary embodiments of the present disclosure.

In at least some exemplary embodiments and as illustrated in FIGS. 1 and 2, the exemplary disclosed system and method may include a system 300. System 300 may include an imaging apparatus 305, a network 310, and one or more user devices 315 (e.g., of one or more users 316). Imaging apparatus 305 may communicate with network 310 and with one or more user devices 315 either directly or via network 310 using any suitable communication technique for example as described herein. Network 310 may be any suitable network such as the exemplary disclosed network described below regarding FIG. 7.

User device 315 may be any suitable user device for receiving input and/or providing output (e.g., raw data or other desired information) to a user (e.g., user 316). User device 315 may be, for example, a touchscreen device (e.g., of a smartphone, a tablet, a smartboard, and/or any suitable computer device), a computer keyboard and monitor (e.g., desktop or laptop), a dedicated user device or interface designed to work specifically with other components of system 300 (e.g., imaging apparatus 305), and/or any other suitable user device or interface. For example, user device 315 may include a touchscreen device of a smartphone or handheld tablet. For example, user device 315 may include a display that may include a graphical user interface to facilitate entry of input by a user and/or receiving output. For example, system 300 may provide input prompts and notifications to a user based on data transmitted to user device 315. User device 315 may communicate with components of imaging apparatus 305 by any suitable technique such as, for example, as described below.

Imaging apparatus 305 may be any suitable apparatus for recording and transmitting image data of an imaging location 320. Imaging apparatus 305 may include any suitable type of surveillance device. Imaging apparatus 305 may be a camera such as a surveillance camera. Imaging apparatus may be a video camera. Imaging apparatus 305 may be a still video camera that provides a still video stream. Imaging apparatus 305 may include a high-definition video-recording device, a thermal imaging device, an x-ray device (e.g., a low-dose radiation device), a non-ionizing electromagnetic radiation device, an infrared imaging device, a night vision device, a light amplification device, and/or any other suitable imaging device. Imaging apparatus 305 may also include any suitable sensors such as, for example, thermal sensors, optical sensors (e.g., diffuse reflective sensors, through beam sensors, and/or retro-reflective sensors), infrared sensors, motion-detection sensors, laser telemeters, and/or any other suitable types of sensors and devices. In at least some exemplary embodiments, imaging apparatus 305 may be a fixed AI-powered surveillance camera.

Imaging apparatus 305 may transmit and receive data (e.g., including image data) from any suitable components of system 300. Imaging apparatus 305 may communicate with network 310 and/or user device 315 via any suitable communication technique such as, for example, via wire communication, wireless communication, Wi-Fi, Bluetooth, network communication, internet, and/or any other suitable technique (e.g., as disclosed herein). Imaging apparatus 305 may transfer image data to user device 315, which may process and display the image data to a user. For example, imaging apparatus 305 may transfer image data of imaging location 320 that may be a location that may be monitored via user device 315 by a user who may be a security guard or security professional.

System 300 may include one or more modules that may be partially or substantially entirely integrated with one or more components of system 300 such as, for example, network 310 and/or user device 315. The one or more modules may include software modules as described for example below regarding FIG. 6. For example, the one or more modules may include computer-executable code stored in non-volatile memory. The one or more modules (e.g., a module for Bluetooth communication, a module for Wi-Fi communication, a module for executing the exemplary disclosed machine learning operations and/or algorithms, and/or any other suitable module) may store data and/or be used to control some or all of the exemplary disclosed processes described herein. The one or more modules may be used in conjunction with an application programming interface (API) for example as described herein (e.g., operated using user device 315).

The exemplary disclosed modules may operate in conjunction with artificial intelligence systems for example as described herein to perform machine learning operations. For example, the exemplary disclosed artificial intelligence systems and/or exemplary disclosed modules may operate to perform the exemplary disclosed processes for example as described herein.

The exemplary disclosed system and method may be used in any suitable application for object detection. The exemplary disclosed system and method may be used in any suitable application utilizing CNN processes or any other suitable machine learning processes. For example, the exemplary disclosed system and method may be used in any suitable surveillance applications such as surveillance camera applications. The exemplary disclosed system and method may be used in any suitable AI-powered surveillance systems.

Figure 5:
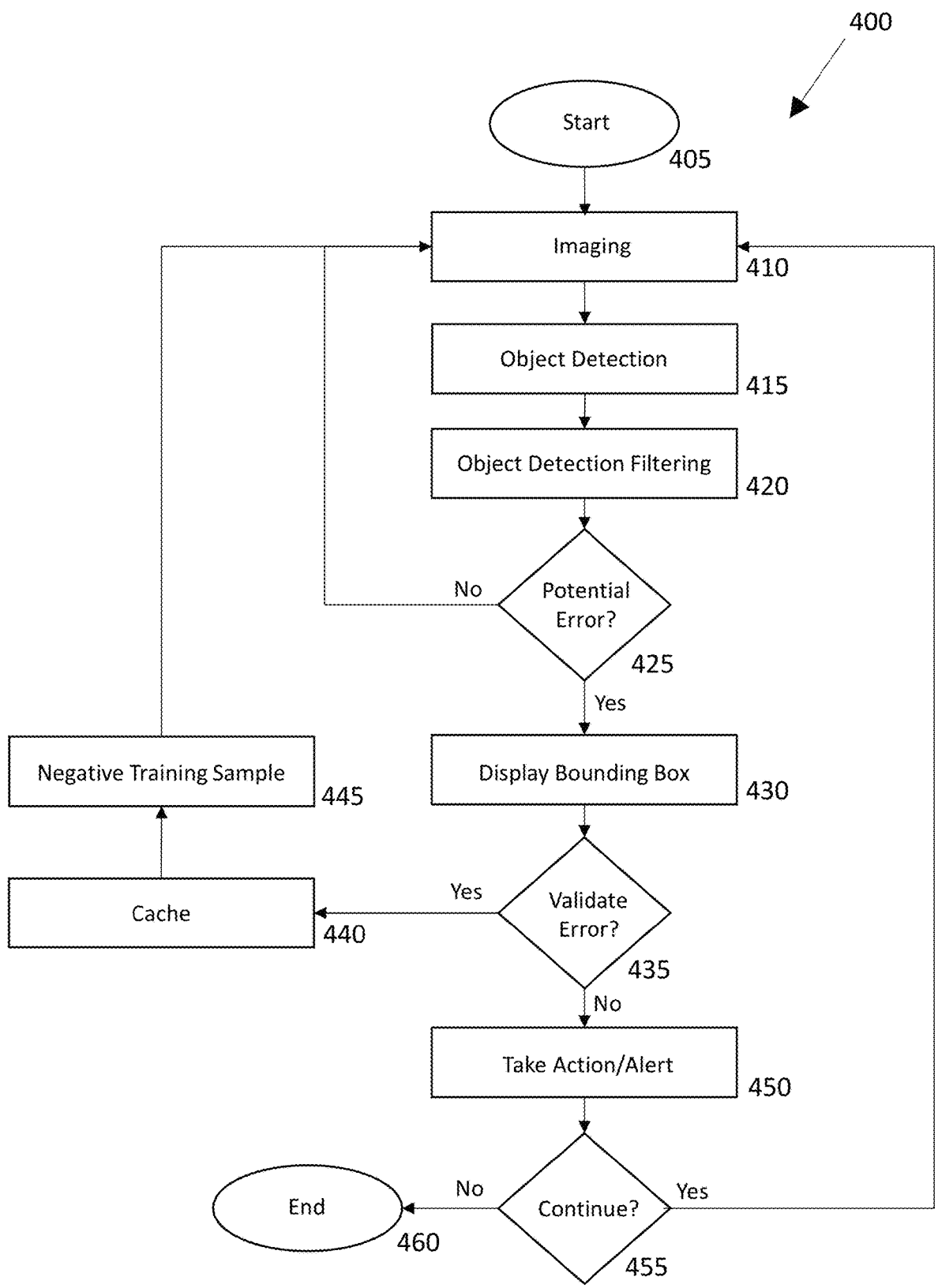
FIG. 5 illustrates an exemplary process of at least some exemplary embodiments of the present disclosure.

FIG. 5 illustrates an exemplary operation of exemplary disclosed system 300. Process 400 begins at step 405. At step 410, imaging apparatus 305 may operate to record, store, and transmit image data such as video data of imaging location 320. Imaging apparatus 305 may transfer data to network 310 and/or user device 315 for example as described herein.

At step 415, system 300 may operate to perform object detection processes using the image data recorded, stored, and transmitted at step 410. System 300 may perform object detection of the image data using Convolutional Neural Network (CNN) and/or any other suitable machine learning approach or technique. Object detection may be performed on one or more still video scenes of the image data provided at step 410. Object detection may be performed to identify types or classes of objects that may present a security risk in a monitored area. For example, object detection may be performed to identify people (e.g., human forms) or vehicles that may be present and/or moving in a monitored area that may be a secured or protected area (e.g., imaging location 320). Any suitable method for object detection may be used such as, for example, neural network approaches such as CNN (e.g., including region-based CNN and/or deformable convolutional networks), non-neural approaches (e.g., histogram of oriented gradients, Viola-Jones object detection, and/or scale-invariant feature transform), and/or any other suitable object detection technique.

Figure 3:
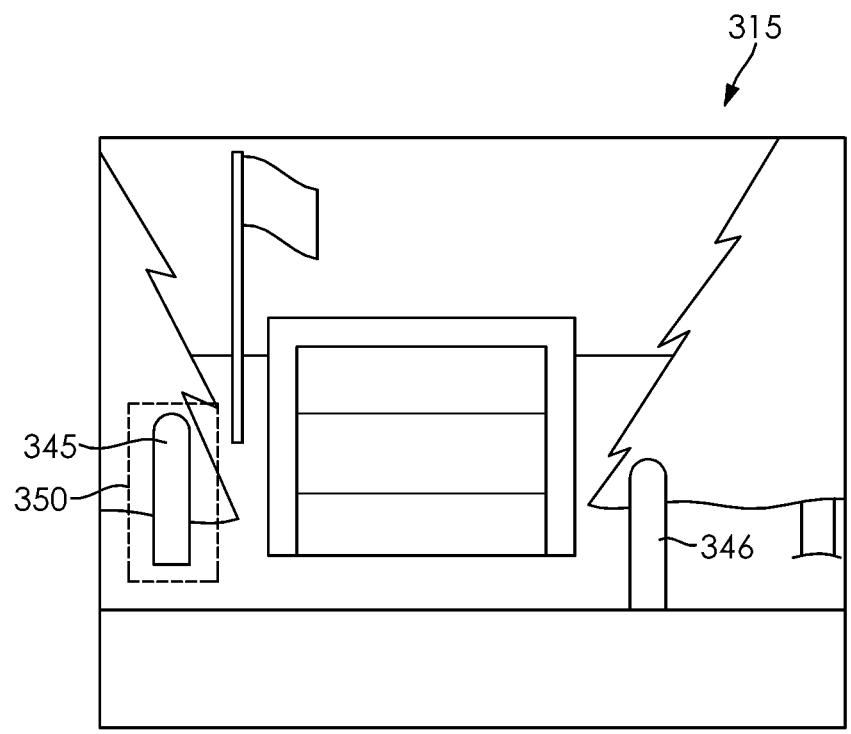
FIG. 3 illustrates a front view of at least some exemplary embodiments of the present disclosure.
Figure 4:
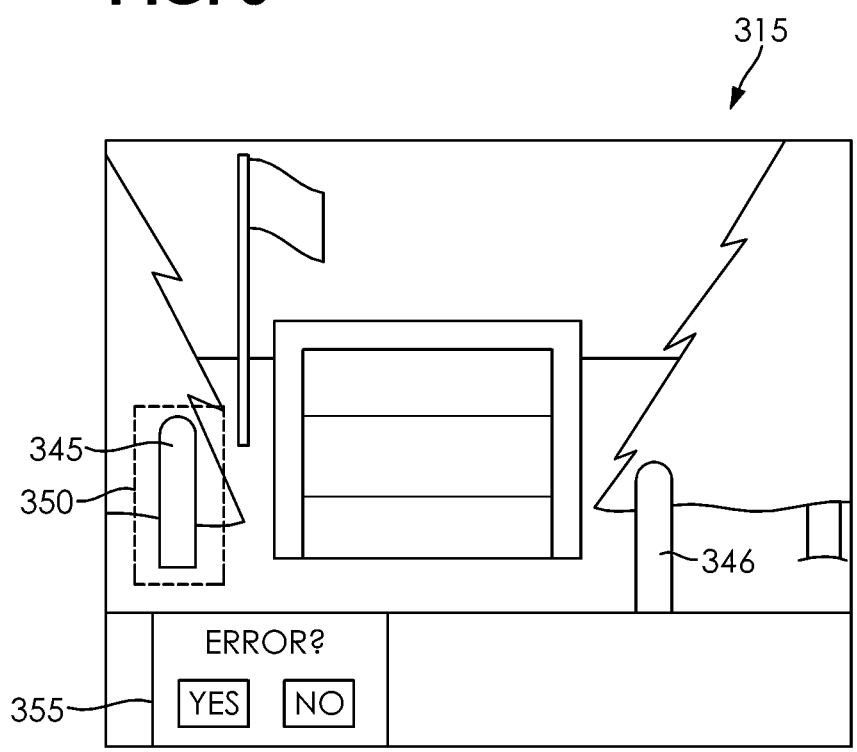
FIG. 4 illustrates a front view of at least some exemplary embodiments of the present disclosure.

At step 420, system 300 may operate to process object detection result data provided at step 415 using non-maximal suppression (NMS) or any other suitable technique for filtering predictions of the object detection processes performed at step 415. System 300 may operate to identify and select a single bounding box for a given identified object from a plurality of overlapping proposed bounding boxes. For example, system 300 may operate using non-maximal suppression to identify a single bounding box that bounds an object (e.g., image data of an object such as an image object 345) identified at step 415. For example as illustrated in FIGS. 3 and 4, a first image object (e.g., image object 345) and/or a second image object (e.g., image object 346) may be included in the image data (e.g., and/or a first plurality of image objects and a second plurality of image objects may be displayed via user device 315 over a period of time to a user). In at least some exemplary embodiments, image object 345 may be associated with a first image object imaged at a first time and also a second image object imaged at a second time (e.g., occurring after the first time). For example as illustrated in FIG. 3, a bounding shape such as a bounding box 350 (e.g., a box, polygon, rectangle, and/or any other suitable shape) may be determined based on non-maximal suppression and/or any other suitable filtering technique and displayed to a user via user device 315. Bounding box 350 may for example bound an image that may be proposed by system 300 to be a human form, a vehicle (e.g., ground vehicle such as a car or truck, aircraft such as a manned or unmanned aircraft or a drone), a robotic object (e.g., robot or remote-control device), or any other object having features of interest (e.g., including features associated with a security risk).

At step 425, system 300 may operate to identify a proposed error based on data associated with bounding box 350. System 300 may operate to determine whether or not an object (e.g., image object 345 bounded by bounding box 350) may be an error for example as described below.

System 300 may determine whether or not image data of a feature disposed within bounding box 350 may have been identified by system 300 in error. For example, system 300 may determine whether or not image data of a feature or object (e.g., image object 345 or image object 346) disposed within bounding box 350 may be a Type 1 error. Such an exemplary disclosed Type 1 error may be a false positive error In at least some exemplary embodiments, the exemplary disclosed error may be a repeating inanimate detection error. For example, the exemplary disclosed Type 1 error may be an inanimate object (e.g., a decoration such as a lawn gnome or other inanimate object that may resemble a human or vehicle or other security threat) that system 300 may classify as a security risk to be identified.

For example, if an object (e.g., a garden gnome) is disposed in front of imaging apparatus 305 and system 300 identifies the object as a person, system 300 may continuously send false alarms to users of system 300 until either the object (e.g., the garden gnome) is removed, imaging apparatus 305 is repositioned or relocated, or a new model (e.g., CNN model) is trained to not detect the object as a person and is deployed. The exemplary disclosed system may operate to identify and remove such error in real-time or near real-time.

A precision error of an object detection system (e.g., system 300) may be reduced (e.g., a precision of a system may be increased) when Type 1 errors are identified and removed for example as described herein, thereby increasing a business or market value of an object detection system.

System 300 may operate to propose that an object (e.g., image object 345 bounded by bounding box 350) may be an error using any suitable technique. For example, system 300 may determine that an object (e.g., image object 345 bounded by bounding box 350) may be an error based on the object remaining in the same location for a predetermined period of time, features of the imaged object such as size or shape, a location of the object relative to other identified objects, input or prompting by a user, a number of times the object has been identified by system 300 (e.g., whether the object is repeatedly identified as having features of interest) and/or users of system 300 during a predetermined time, whether the object experiences random motion that may be associated with an inanimate object (e.g., wind), whether the object has both features indicative of an inanimate object and also features of interest to be identified (e.g., features of a human or vehicle or other security threat), and/or any other criteria, data, or proposals indicating that an object may have been identified by system 300 in error (e.g., Type 1 error). System 300 may operate to make this determination using any exemplary disclosed technique such as, for example, using exemplary disclosed machine learning operations.

Data of the proposed error may include spatial coordinates and/or dimensions of bounding box 350 and/or an image data of a feature or object (e.g., image object 345 or image object 346) disposed within bounding box 350. System 300 may operate to discriminate between the exemplary disclosed proposed false alarms (e.g., Type 1 errors such as false positive errors) and potential real alarms (e.g., true positives) intelligently. For example, bounding box 350 may include a single object to be validated as an error. For example, system 300 may include a single object in bounding box 350 (e.g., the example of the garden gnome) and not also additional objects. This may prevent system 300 from being compromised by threat objects (e.g., people and vehicles) being ignored by system 300 by approaching imaging apparatus 305 at a location of an object (e.g., image object 345 bounded by bounding box 350 such as, for example, the garden gnome) to be validated as error. That is for example, system 300 may not ignore other objects such as people, vehicles, or other threats disposed near an object (e.g., image object 345) bounded by bounding box 350. System 300 may thereby operate to identify a single object potentially constituting an error (e.g., a Type 1 error) and creating a false alarm. Identifying the single object may be achieved by the exemplary disclosed non-maximal suppression (NMS) or any other suitable filtering technique for example at step 420 (and/or occurring simultaneously with step 425). System 300 may thereby bound a single object (e.g., a single object such as image object 345 bounded by bounding box 350). This may substantially prevent including multiple objects (e.g., more than one object) in bounding box 350. In at least some exemplary embodiments, using NMS or other suitable filtering may preclude or avoid significant computation, which may allow the exemplary disclosed system and method to run the exemplary disclosed process (e.g., process 400) in real-time or near real-time.

If system 300 determines at step 425 that an object (e.g., image object 345 bounded by bounding box 350) may not be an error, process 400 returns to step 410. If system 300 determines at step 425 that an object (e.g., image object 345 bounded by bounding box 350) may be an error, process 400 proceeds to step 430. At step 430, system 300 may operate to display bounding box 350 to a user via a display of user device 315 for example as illustrated in FIG. 3.

At step 435 and for example as illustrated in FIG. 4, system 300 may prompt a user to enter input to validate whether or not an object (e.g., image object 345 bounded by bounding box 350) may be an error (e.g., a Type 1 error such as a repeating inanimate detection error). For example, a graphical element 355 (e.g., a dialog box) may be displayed to a user via a display of user device 315. Graphical element 355 may include any suitable text, graphics, or symbols for requesting input or validation from a user monitoring user device 315 to verify whether or not an object (e.g., image object 345 bounded by bounding box 350) is an error. In at least some exemplary embodiments, a user may use user device 315 to control the display of user device 315 and/or imaging apparatus 305 to zoom in on and/or provide further data or resolution regarding the object (e.g., image object 345) bounded by bounding box 350 (e.g., to help the user determine whether or not the detected object is an error). In at least some exemplary embodiments, a user may use user device 315 to input and identify errors in object identification to system 300 (e.g., the user may use user device 315 to provide bounding box 350 to system 300).

System 300 may provide bounding box 350 and graphical element 355 in a manner to minimize effort by a user in validating errors. For example, bounding box 350 may be provided to a user intermittently (e.g., not often or continuously) so that a user does not experience fatigue in continuously validating errors for system 300. Also for example, graphical element 355 may be provided with clear and simple text so that a user may quickly provide input to validate an error or input that an error is not present (e.g., that the object is a true positive and not an error). An operation of system 300 may thereby be significantly enhanced with relatively little effort and input from a user. For example, system 300 may present a simple yes or no question to a user via graphical element 355 such as "is this object a person?" or "is this object a vehicle?" If the user responds for example that the object (e.g., image object 345) is not a person or is not a vehicle, the user may thereby validate that an object identification error of system 300 has occurred.

If a user validates an error at step 435 (e.g., by entering input via user device 315 with graphical element 355), system 400 proceeds to step 440. Once the error is confirmed, system 300 (e.g., including imaging apparatus 305, network 310, and/or user device 315) stores data of the object validated as an error (e.g., operates to cache features of the error in the memory of system 300). Using the stored data of the cached features, system 300 may construct a similarity model on top of the original exemplary disclosed object detection model and use it to filter the validated error (e.g., repeating detection errors) moving forward. System 300 may cache the most recent validated error (e.g., repeating inanimate detection errors) verified by humans at step 435 (e.g., which may be iteratively repeated as described herein). By saving and storing data of more than one error feature in the cache, system 300 may operate to cover and/or consider some (e.g., most) or substantially all detection errors generated from the imaged scene (e.g., of imaging location 320) based on the exemplary disclosed human user validation. A storage size of the exemplary disclosed cache may be based on software and/or hardware of components of system 300 (e.g., of imaging apparatus 305 and/or user device 315) and/or a predetermined size (e.g., an optimally-determined size of the cache) to optimize an operation and efficiency of system 300.

The exemplary disclosed cached detection errors may provide a "short-term memory" to be used during an operation of system 300. When a new object detection result occurs (e.g., a new error is validated at step 435), system 300 may use the exemplary disclosed similarity model to remove detected objects that may be similar to any of the cached errors (e.g., so that false positives are not identified to a user), and then process the remaining detected objects. This may reduce an amount of false positives and increase a precision of object identification by system 300. By doing so, human users may validate a few errors (e.g., at step 435) at a beginning of a monitoring period, after which some (e.g., most) or substantially all of the errors (e.g., Type 1 errors such as repeating inanimate detection errors) may stop being identified and displayed (e.g. coming back) to a user during an operation of system 300. Users may thereby experience less fatigue from considering false positives of object identification operations by system 300.

In at least some exemplary embodiments, the human engagement at step 435 may be relatively small. This relatively small amount of human engagement may allow for verification of repeating inanimate detection errors based on data provided by imaging apparatus 305 that may be a still camera, with data of the validated errors being stored as a "short-term memory." This exemplary disclosed cached memory may provide prior data (e.g., a very strong prior) and may allow system 300 to use the exemplary disclosed similarity model (e.g., a relatively simple and computationally economical similarity model) to effectively filter a relatively large amount of similar "noise." For example by using the exemplary disclosed cache, a searching algorithm of system 300 may identify the existence of similar features in the cache for each newly detected object (e.g., at step 415), which may allow system 300 to identify errors so that false positives involving those detected objects (e.g., objects similar to an object associated with a validated error) are not identified to the user.

At step 445, system 300 may store, utilize, and transmit data of the validated errors of the cache as a negative training sample for other machine learning models (e.g., other models used for object identification for surveillance). The data may be for example transferred for use in other models via network 310. Process 400 may then return to step 410 and be iteratively repeated as desired.

If an error is not validated (e.g., invalidated) at step 435 based on the exemplary disclosed human interaction, process 400 may proceed to step 450. At step 450, system 300 may take any suitable action or transfer data of an alert in the case that the detected object evaluated by the user at step 435 is actually a true positive (e.g., is actually a true security threat such as a trespassing person or vehicle). For example, system 300 may transmit data to trigger or provide notification of a security alert using any suitable technique.

At step 455, system 300 may determine whether an operation is to be continued. If an operation is to be continued, process 400 returns to step 410 and process 400 may be iteratively repeated as desired. If an operation is not to be continued, process 400 ends at step 460.

In at least some exemplary embodiments, the exemplary disclosed system and method may suppress object detection noise in real-time for surveillance cameras using a human-in-the-loop system. When a detection result is integrated with humans in the loop, such as with an AI surveillance camera system with live guard monitoring, the error may be validated by humans to confirm the error is actually a repeating inanimate detection error. The exemplary disclosed system and method may suppress errors such as repeating CNN object detection errors in real-time or near real-time with a relatively small amount (e.g., a little) human engagement. A suitable expectation management process may be used to evaluate the exemplary disclosed human engagement.

In at least some exemplary embodiments, the exemplary disclosed system and method may significantly reduce a number of false alarms, thereby increasing an efficiency of employees. For example, a guard watching a display based on a data stream from imaging apparatus 305 may not be distracted by false alarms, which may substantially prevent fatigue, inattention, missed security risks, and other problems associated with live remote guarding.

In at least some exemplary embodiments, the exemplary disclosed system and method may make use of human engagement (e.g., "human in the loop"), thereby using a relatively small amount of human effort to accomplish a significant task. Based for example on the exemplary disclosed human engagement and processes such as NMS, computational resources used in the exemplary disclosed system and method may be reduced and the intellect of a human may be captured very quickly and replicated in real-time or near real-time.

In at least some exemplary embodiments, the exemplary disclosed system and method may significantly reduce detection errors while introducing few or substantially no false negative errors because the errors may be validated (e.g., verified) by humans. The exemplary disclosed system and method may provide effective noise filtering for cases associated with waving flags, trees, and similar motion. The exemplary disclosed system and method may reduce some or substantially all kinds of repeating inanimate detection errors in real-time or near real-time without a retraining of a CNN model. Further, the error features verified by humans (e.g., at step 435) may be used for training a better model. The exemplary disclosed system and method may serve as an immediate solution for suppressing novel detection errors that have not been learned by a model of an artificial intelligence system.

In at least some exemplary embodiments, the exemplary disclosed system and method may provide a similarity model having selection ranges from a similar decision tree to a complicated CNN-trained embodiment with cosine similarity loss. Actual model selection may be based for example on available runtime computational resources of the exemplary disclosed system.

In at least some exemplary embodiments, an additional classifier model may be trained using the exemplary disclosed human verified detection errors (e.g., at step 435) as negative samples and the normal detection results of system 300 as positive samples. The classifier may then be integrated into the exemplary disclosed system to further reduce an amount of human engagement. In at least some exemplary embodiments, if a prediction occurs on an edge device of the exemplary disclosed system and method and the device allows on-edge training, the classifier may be trained locally with a subset of data that may be related to a target camera so that each camera may customize its own noise filtering model. Further for example, instead of working directly on the exemplary disclosed CNN detection results, the exemplary disclosed similarity model may also work on tracked objects that may associate results (e.g., "vanilla" CNN detection results) across multiple frames.

In at least some exemplary embodiments, the exemplary disclosed system and method may provide an AI-powered surveillance system that may use deep learning for detection with real-time or near real-time human monitoring. The exemplary disclosed system and method may remove a significant amount of false positives during an operation of the exemplary disclosed system and may reduce monitoring expenses. The exemplary disclosed system and method may also provide an AI-powered surveillance system that may use deep learning for detection and may send notifications to users. User device 315 may allow users to verify repeating inanimate detection errors, which may remove a significant amount of false positives from an operation of the exemplary disclosed system and may increase the reliability of a system.

In at least some exemplary embodiments, the exemplary disclosed method may include providing an imaging apparatus (e.g., imaging apparatus 305), recording image data of an imaging location using the imaging apparatus, displaying the image data to a user via a user device (e.g., user device 315), selecting an image object from the image data based on a selection criteria, and determining whether or not a selection criteria error of the image object is to be checked. The exemplary disclosed method may also include displaying a bounding shape, which bounds the image object, to the user via the user device when the selection criteria error is to be checked, prompting the user to enter user input indicating whether or not the selection criteria error is present, and storing data of the image object in a cache when the user input indicates that the selection criteria error is present. The exemplary disclosed method may also include selecting a second image object from the image data based on the selection criteria, and subsequently deselecting the second image object based on comparing the second image object to the data of the image object stored in the cache. The second image object may be similar to the image object. The exemplary disclosed method may further include storing data of a plurality of image objects in the cache, selecting a plurality of second image objects from the image data based on the selection criteria, and subsequently deselecting the plurality of second image objects based on comparing the plurality of second image objects to data of the plurality of image objects stored in the cache. Displaying the bounding shape may include processing the image data using using non-maximal suppression and identifying the bounding shape that is a single bounding box. The exemplary disclosed method may further include using the data of the image object as a negative training sample for a plurality of machine learning models. The image object may be selected as a false positive error from the image data based on the selection criteria. Prompting the user to enter user input may include displaying a graphical element via the user device to the user to select whether or not the image object is a false positive error selected based on the selection criteria. The selection criteria may include selecting at least one image object selected from the group of an image of a human, an image of a vehicle, and combinations thereof. The imaging apparatus may be a still video camera and the image data includes a still video stream. The data of the image object stored in the cache may be data of a validated false positive error stored in a short-term memory. The validated false positive error may be validated based on the user entering the user input indicating that the selection criteria error is present. Selecting the image object from the image data based on the selection criteria may include performing object detection of the image object using convolutional neural network object detection.

In at least some exemplary embodiments, the exemplary disclosed system may be a surveillance detection error reduction system including an imaging apparatus (e.g., imaging apparatus 305), a user device (e.g., user device 315), a surveillance detection error reduction module, comprising computer-executable code stored in non-volatile memory, and a processor. The imaging apparatus, the user device, the surveillance detection error reduction module, and the processor may be configured to record image data of an imaging location using the imaging apparatus, display the image data to a user via the user device, select a first image object from the image data based on a selection criteria, determine whether or not a selection criteria error of the first image object is to be checked, and display a bounding shape, which bounds the first image object, to the user via the user device when the selection criteria error is to be checked. The imaging apparatus, the user device, the surveillance detection error reduction module, and the processor may also be configured to prompt the user to enter user input indicating whether or not the selection criteria error is present, store data of the first image object in a cache when the user input indicates that the selection criteria error is present, and select a second image object from the image data based on the selection criteria and then subsequently deselect the second image object based on comparing the second image object to the data of the first image object stored in the cache. The selection criteria may include selecting at least one image object selected from the group of an image of a human, an image of a vehicle, and combinations thereof. Both the first image object and the second image object may not meet the selection criteria. Selecting the first image object and the second image object from the image data based on the selection criteria may include performing object detection of the first image object and the second image object using convolutional neural network object detection. Displaying the bounding shape may include processing the image data using using non-maximal suppression.

In at least some exemplary embodiments, the exemplary disclosed method may include providing a still video camera (e.g., imaging apparatus 305), recording image data of an imaging location using the still video camera, displaying the image data to a user via a user device (e.g., user device 315), selecting an image object from the image data based on a selection criteria using convolutional neural network object detection, and determining whether or not a selection criteria error of the image object is to be checked. The exemplary disclosed method may also include determining a bounding box using using non-maximal suppression and displaying the bounding box, which bounds the image object, to the user via the user device when the selection criteria error is to be checked, prompting the user to enter user input indicating whether or not the selection criteria error is present, and storing data of the image object in a cache when the user input indicates that the selection criteria error is present. Prompting the user to enter user input may include displaying a dialog box via the user device to the user to select whether or not the image object is a false positive error selected based on the selection criteria. The image object may be the false positive error when the image object is not an image of a human or an image of a vehicle. The exemplary disclosed method may further include preventing identification of a second image object to the user based on comparing the second image object to the data of the image object stored in the cache. Comparing the second image object to the data of the image object stored in the cache may include comparing the second image object to a similarity model constructed using the data of the image object stored in the cache. The exemplary disclosed method may also include transferring alert data based on the data of the image object when the user input indicates that the selection criteria error is not present.

The exemplary disclosed system and method may provide an efficient and effective technique for reducing a risk of false negatives associated with object detection. The exemplary disclosed system and method may provide a technique for efficiently filtering "noisy" objects such as objects that experience random motion such as from wind. The exemplary disclosed system and method may reduce repeating inanimate detection errors associated with object detection.

Figure 6:
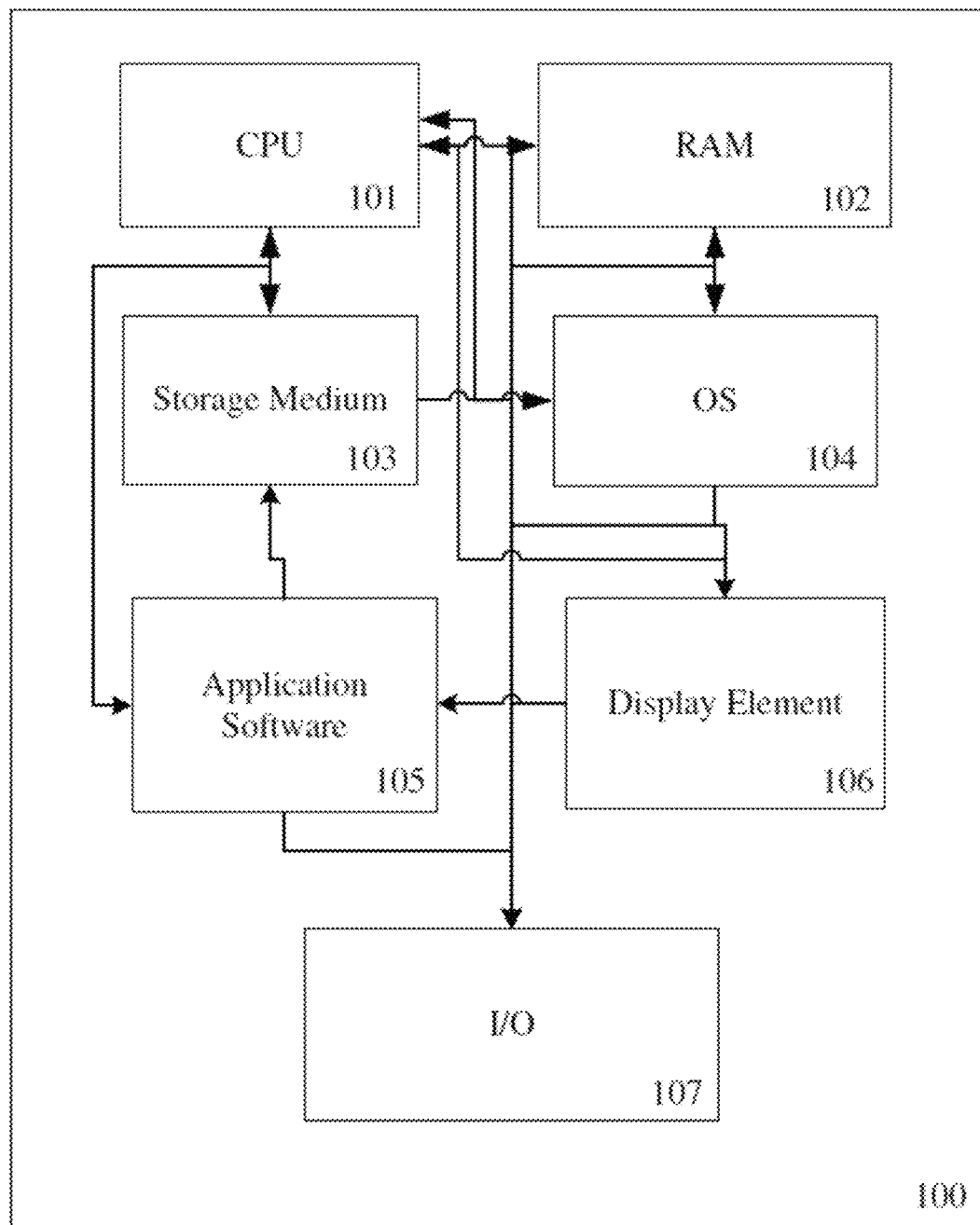
FIG. 6 is a schematic illustration of an exemplary computing device, in accordance with at least some exemplary embodiments of the present disclosure.

An illustrative representation of a computing device appropriate for use with embodiments of the system of the present disclosure is shown in FIG. 6. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wi-Fi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 7, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 7:
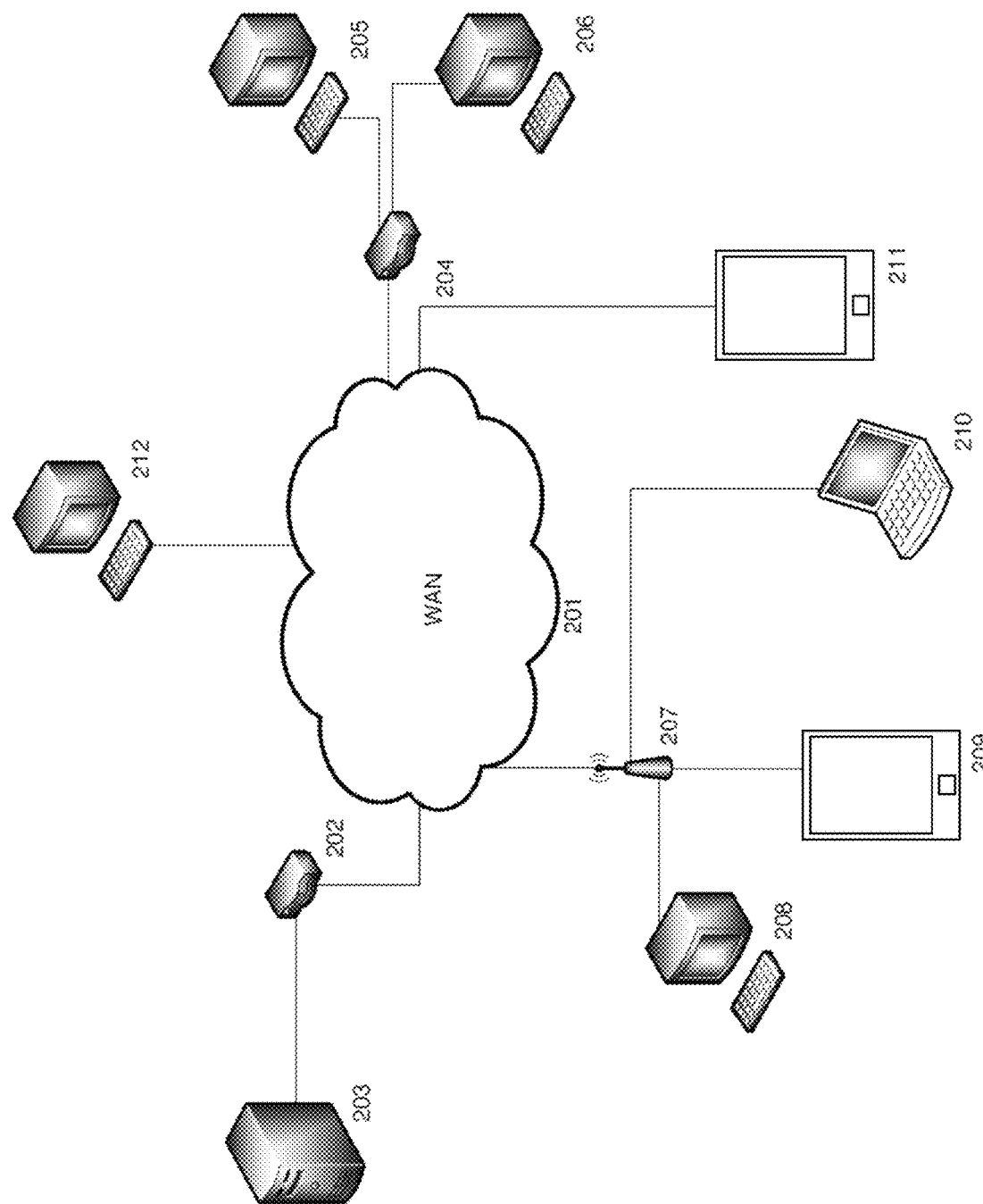
FIG. 7 is a schematic illustration of an exemplary network, in accordance with at least some exemplary embodiments of the present disclosure.

Referring to FIG. 7, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 7, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GSM, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including text, binary data, image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

The exemplary disclosed system may for example utilize collected data to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary disclosed system may utilize neural network-based artificial intelligence to predictively assess risk. For example, the exemplary neural network may include a plurality of input nodes that may be interconnected and/or networked with a plurality of additional and/or other processing nodes to determine a predicted result (e.g., a location as described for example herein).

For example, exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. For example, the prediction algorithms and approach may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets. Also for example, exemplary artificial intelligence processes may include processing for training a machine learning model to make predictions based on data collected by the exemplary disclosed apparatus.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation Kotlin, Swift, C#, PHP, C, C++, Assembler, Java, HTML, JavaScript, CSS, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of mobile applications, firmware for monitoring devices, web-based computer software, and so on, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies.

Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed system and method. It is intended that the specification and examples be considered as exemplary only, with a true scope being indicated by the following claims.

What is claimed is:

1. A method, comprising:
providing an imaging apparatus;
recording image data of an imaging location using the imaging apparatus;
displaying the image data to a user via a user device;
selecting, using a machine learning model, a first image object from the image data based on a selection criteria;
determining, using the machine learning model, whether or not a selection criteria error of the first image object is to be checked;
displaying a bounding shape, which bounds the first image object, to the user via the user device when the selection criteria error is to be checked;
prompting the user to enter user input indicating whether or not the selection criteria error is present;
storing data of the first image object in a cache as a negative training set in response to the user input indicating that the selection criteria error is present;
updating the machine learning model in real-time to remove the selection criteria error using the negative training set to generate an updated machine learning model;
selecting, using the updated machine learning model, a second image object from the image data based on the selection criteria; and
determining, using the updated machine learning model, whether or not a selection criteria error of the first image object is to be checked.

2. The method of claim 1, further comprising:
selecting a third image object from the first image data based on the selection criteria; and
subsequently deselecting the third image object based on comparing the third image object to the data of the first image object stored in the cache.

3. The method of claim 2, wherein the third image object is similar to the first image object.

4. The method of claim 1, further comprising:
storing data of a plurality of image objects in the cache;
selecting a plurality of second image objects from the image data based on the selection criteria; and
subsequently deselecting the plurality of second image objects based on comparing the plurality of second image objects to data of the plurality of image objects stored in the cache.

5. The method of claim 1, wherein displaying the bounding shape includes processing the first image data using non-maximal suppression and identifying the bounding shape that is a single bounding box.

6. The method of claim 1, wherein prompting the user to enter user input includes displaying a graphical element via the user device to the user to select whether or not the first image object is a false positive error selected based on the selection criteria.

7. The method of claim 1, wherein the selection criteria includes selecting at least one first image object selected from the group of an image of a human, an image of a vehicle, and combinations thereof.

8. The method of claim 1, wherein the imaging apparatus is a still video camera and the image data includes a still video stream.

9. The method of claim 1, wherein:
the data of the first image object stored in the cache is data of a validated false positive error stored in a short-term memory; and
the validated false positive error is validated based on the user entering the user input indicating that the selection criteria error is present.

10. The method of claim 1, wherein selecting the first image object from the image data based on the selection criteria includes performing object detection of the first image object using convolutional neural network object detection.

11. A surveillance detection error reduction system, comprising:
   an imaging apparatus;
   a user device;
   a surveillance detection error reduction module, comprising computer-executable code stored in non-volatile memory; and
   a processor;
   wherein the imaging apparatus, the user device, the surveillance detection error reduction module, and the processor are configured to:
   record image data of an imaging location using the imaging apparatus;
   display the image data to a user via the user device;
   select, using a machine learning model, a first image object from the image data based on a selection criteria;
   determine, using the machine learning model, whether or not a selection criteria error of the first image object is to be checked;
   display a bounding shape, which bounds the first image object, to the user via the user device when the selection criteria error is to be checked;
   prompt the user to enter user input indicating whether or not the selection criteria error is present;
   store data of the first image object in a cache as a negative training set in response to the user input indicating that the selection criteria error is present;
   update the machine learning model in real-time to remove the selection criteria error using the negative training set to generate an updated machine learning model;
   select, using the updated machine learning model, a second image object from the image data based on the selection criteria; and
   determine, using the updated machine learning model, whether or not a selection criteria error of the first image object is to be checked
   select a third image object from the image data based on the selection criteria and then subsequently deselect the third image object based on comparing the third image object to the data of the first image object stored in the cache.

12. The surveillance detection error reduction system of claim 11, wherein:
   the selection criteria includes selecting at least one image object selected from the group of an image of a human, an image of a vehicle, and combinations thereof; and
   both the first image object and the third image object do not meet the selection criteria.

13. The surveillance detection error reduction system of claim 11, wherein:
   selecting the first image object, the second image object, and the third image object from the image data based on the selection criteria includes performing object detection of the first image object, the second image object, and the third image object using convolutional neural network object detection; and
   displaying the bounding shape includes processing the image data using non-maximal suppression.

14. A method, comprising:
   providing a still video camera;
   recording image data of an imaging location using the still video camera;
   displaying the image data to a user via a user device;
   selecting, using a machine learning model, a first image object from the image data based on a selection criteria using convolutional neural network object detection;
   determining, using the machine learning model, whether or not a selection criteria error of the first image object is to be checked;
   determining a bounding box using non-maximal suppression and displaying the bounding box, which bounds the first image object, to the user via the user device when the selection criteria error is to be checked;
   prompting the user to enter user input indicating whether or not the selection criteria error is present;
   storing data of the first image object in a cache as a negative training set in response to the user input indicating that the selection criteria error is present;
   updating the machine learning model in real-time to remove the selection criteria error using the negative training set to generate an updated machine learning model;
   selecting, using the updated machine learning model, a second image object from the image data based on the selection criteria; and
   determining, using the updated machine learning model, whether or not a selection criteria error of the first image object is to be checked.

15. The method of claim 14, wherein prompting the user to enter user input includes displaying a dialog box via the user device to the user to select whether or not the first image object is a false positive error selected based on the selection criteria.

16. The method of claim 15, wherein the first image object is the false positive error when the image object is not an image of a human or an image of a vehicle.

17. The method of claim 14, further comprising preventing identification of a third image object to the user based on comparing the third image object to the data of the first image object stored in the cache.

18. The method of claim 14, wherein comparing the third image object to the data of the first image object stored in the cache includes comparing the third image object to a similarity model constructed using the data of the first image object stored in the cache.

19. The method of claim 14, further comprising transferring alert data based on the data of the first image object when the user input indicates that the selection criteria error is not present.

* * * * *